(12) United States Patent
Nataraj et al.

(10) Patent No.: US 6,315,973 B1
(45) Date of Patent: *Nov. 13, 2001

(54) PROCESS FOR OPERATING EQUILIBRIUM CONTROLLED REACTIONS

(75) Inventors: Shankar Nataraj, Allentown; Brian Thomas Carvill, Orefield; Jeffrey Raymond Hufton, Fogelsville; Steven Gerard Mayorga; Thomas Richard Gaffney, both of Allentown; Jeffrey Richard Brzozowski, Bethlehem, all of PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 08/624,147

(22) Filed: Apr. 8, 1996

Related U.S. Application Data

(63) Continuation-in-part of application No. 08/419,317, filed on Apr. 10, 1995.

(51) Int. Cl.[7] ............... C01B 3/24; C01B 31/18
(52) U.S. Cl. ............ 423/418.2; 423/652; 423/659
(58) Field of Search .................. 423/651, 652, 423/653, 654, 655, 656, 659, 418.2, 437, 437.2; 95/97

(56) References Cited

U.S. PATENT DOCUMENTS

| | | | |
|---|---|---|---|
| 5,141,662 | * 8/1992 | Dexheimer et al. | 252/73 |
| 5,256,172 | * 10/1993 | Keefer | 423/230 |
| 5,449,696 | * 9/1995 | Dandekar et al. | 518/706 |

FOREIGN PATENT DOCUMENTS

| | | | |
|---|---|---|---|
| 58-49436 | * 3/1983 | (JP) | 95/140 |

* cited by examiner

Primary Examiner—Stuart L. Hendrickson
(74) Attorney, Agent, or Firm—Keith D. Gourley

(57) ABSTRACT

A cyclic process for operating an equilibrium controlled reaction in a plurality of reactors containing an admixture of an adsorbent and a reaction catalyst suitable for performing the desired reaction which is operated in a predetermined timed sequence wherein the heating and cooling requirements in a moving reaction mass transfer zone within each reactor are provided by indirect heat exchange with a fluid capable of phase change at temperatures maintained in each reactor during sorpreaction, depressurization, purging and pressurization steps during each process cycle.

27 Claims, 8 Drawing Sheets

CO$_2$/H$_2$O Binary Isotherms for Potassium Carbonate Modified Double Layered Hydroxides at 400°C

PROCESS FOR OPERATING EQUILIBRIUM CONTROLLED REACTIONS

CROSS-REFERENCE TO RELATED APPLICATIONS

This application is a continuation-in-part to copending U.S. patent application Ser. No. 08/419,317, filed Apr. 10, 1995, the Specification and claims of which are incorporated by reference and made a part of this application.

RIGHTS OF THE UNITED STATES GOVERNMENT

The subject matter presented in this patent application was funded in part by the United States Department of Energy (DOE) under Cooperative Agreement No. DE-FC36-95GO10059. The DOE may possess certain rights under the claims appended hereto.

TECHNICAL FIELD OF THE INVENTION

The present invention is a cyclic process for operating equilibrium controlled reactions in a system which comprises a plurality of reactors operated in a predetermined timed sequence wherein the heating and cooling requirements in a moving reaction mass transfer zone within each reactor are provided by indirect heat exchange with a fluid capable of phase change at temperatures maintained in each reactor during sorpreaction, depressurization, purging and pressurization steps.

BACKGROUND OF THE INVENTION

The chemical industry performs numerous equilibrium controlled reactions to manufacture a wide range of chemical raw materials, intermediates and products. Product yield obtained in such equilibrium controlled reactions is typically limited by the thermodynamic equilibrium of the reaction. Therefore, such reactions are typically operated at an elevated temperature for endothermic reactions or at a reduced temperature for exothermic reactions in order to shift equilibrium toward the product direction. Thus, the chemical industry has been searching for improved processes for operating equilibrium controlled reactions at reduced temperatures for endothermic reactions wherein product yield is not substantially diminished due to unfavorable thermodynamic equilibrium constants.

Representative equilibrium controlled reactions include methane and hydrocarbon steam reforming reactions which are used to manufacture hydrogen or synthesis gas, the water gas shift reaction for converting CO to $CO_2$, as well as the reverse water gas shift reaction for converting $CO_2$ to CO. Some of these reactions are typically carried out at relatively high temperatures to shift the equilibrium toward the product direction as well as to obtain relatively faster reaction kinetics. Significant efforts have been described in the literature to improve reaction kinetics by identifying new catalysts and by controlling process operating conditions. Additionally, the concept of removing a product from a reaction zone to increase product conversion is well known.

Representative processes for operating equilibrium controlled reactions include an article by Vaporciyan and Kadlec (AIChE Journal, Vol. 33, No. 8, August 1987) which discloses a unit operation comprising a rapid pressure swing cycle in a catalytic-adsorbent bed to effect both continuous gas-phase reaction and separation. The hybrid device combines features of a pressure swing adsorber with those of a flow-forced catalytic reactor.

Westerterp and coworkers (Hydrocarbon Processing) p. 69 (November 1988) disclose two process schemes for improving conversion of hydrogen and carbon monoxide to methanol. The first embodiment employs a Gas-Solid-Solid Trickle Flow Reactor (GSSTFR) wherein a solid adsorbent is trickled through a packed bed reactor to remove methanol from the reaction zone which results in increased production of methanol. The adsorbent saturated with methanol is collected on a continuous basis using multiple storage tanks wherein the methanol is desorbed by reducing the pressure. The second embodiment employs a Reactor System with Interstage Product Removal (RSIPR) wherein methanol is synthesized in several stages and removed utilizing a liquid solvent. High conversion of methanol per pass is achieved in a series of adiabatic or isothermal fixed bed reactors. Product is selectively removed in absorbers situated between the respective reactor stages.

Prior art processes for conducting simultaneous reaction and adsorption steps have not achieved commercial success because product flow rates do not remain sufficiently constant and the desired products are present in unacceptably low concentrations with respect to the undesired reaction products, unreacted feedstock and purge fluids. Industry is searching for a process for operating equilibrium controlled reactions which can be operated in continuous mode at reduced reaction temperatures wherein a reaction product can be produced in substantially pure form at high conversion, under relatively constant flow rate and at feedstock pressure.

BRIEF SUMMARY OF THE INVENTION

The present invention relates to a continuous process for operating equilibrium controlled reactions which overcomes problems associated with prior art processes wherein product flow rates do not remain relatively constant and the desired product is present in unacceptably low concentrations with respect to other reaction products, unreacted feedstock as well as the purge and rinse fluids used to desorb the desired product from the adsorbent residing in the reactor.

Applicants have overcome such problems by developing a cyclic process, operated under isothermal conditions, which utilizes a plurality of reactors operated in a predetermined timed sequence wherein the heating and cooling requirements in a moving reaction mass transfer zone within each reactor are provided by indirect heat exchange with a fluid capable of phase change at temperatures maintained in each reactor during sorpreaction, depressurization, purging and pressurization steps. The following five steps of the general embodiment are performed in each reactor during a process cycle.

The first step of the process comprises reacting a feedstock at a first pressure in a first reactor containing an admixture of an adsorbent and a catalyst suitable for conducting the equilibrium controlled reaction under reaction conditions sufficient to convert the feedstock into a more adsorbable product which is selectively adsorbed by the adsorbent and a less adsorbable product and withdrawing a stream which is enriched in the less adsorbable product and depleted in the more adsorbable product as well as unreacted feedstock.

The second step comprises countercurrently depressurizing the first reactor to a second pressure by withdrawing a mixture comprising unreacted feedstock, a portion of the less adsorbable product and a portion of the more adsorbable product.

The third step comprises countercurrently purging the first reactor at the second pressure with a weakly adsorbing purge fluid with respect to the adsorbent to desorb the more adsorbable product from the adsorbent and withdrawing a mixture comprising unreacted feedstock, a portion of the more adsorbable product and a portion of the less adsorbable product.

The fourth step comprises countercurrently purging the first reactor at the second pressure with the less adsorbable product to desorb the weakly adsorbing purge fluid and withdrawing a mixture comprising the weakly adsorbing purge fluid, a portion of the more adsorbable product and a portion of the less adsorbable product.

The fifth step comprises countercurrently pressurizing the first reactor from the second pressure to the first pressure with the less adsorbable product prior to commencing another process cycle within the first reactor.

The general embodiment can be readily adapted to utilize the following additional step following the first step and prior to the second step wherein the first reactor is countercurrently purged at the first pressure with a weakly adsorbing purge fluid and a mixture comprising unreacted feedstock, a portion of the more adsorbable product and a portion of the less adsorbable product is withdrawn from the first reactor at the first pressure. Optionally, this mixture comprising the unreacted feedstock, the more adsorbable product and the less adsorbable product can be separated to form a stream comprising unreacted feedstock and the unreacted feedstock can be recycled for use as feedstock in the first step of the process.

Applicants' process can be readily adapted to perform a variety of additional steps in order to further separate the process streams by conventional methods such as distillation to yield higher purity products or a source process fluids which may be recycled. For example, the stream of the first step which is enriched in the less adsorbable product and depleted in the more adsorbable product as well as unreacted feedstock can be separated to form a stream comprising the less adsorbable product. The stream of the third step comprising unreacted feedstock, a portion of the more adsorbable product and a portion of the less adsorbable product can also be separated to form a stream comprising the more adsorbable product. Finally, the mixture of the fourth step comprising the weakly adsorbable purge fluid, a portion of the more adsorbable product and a portion of the less adsorbable product can be separated to form a stream comprising the weakly adsorbable purge fluid and recycling a portion of the stream for use as the weakly adsorbing purge fluid in the third step.

The present process can be utilized in any endothermic or exothermic equilibrium controlled process including homogeneous reactions involving solely gaseous reactants, and heterogeneous, catalytic reactions involving gaseous reactants. Moreover, the present process can be readily adapted for use in equilibrium controlled reactions which are capable of operation in the absence of a catalyst. The general embodiment is followed with the exception that the reactors contain only adsorbent for the more adsorbable product.

While Applicants' invention is suitable for operating any equilibrium controlled process, Applicants have identified reactions which are particularly suited for operation using their claimed process. Preferred reactions include the reverse water gas shift reaction for producing carbon monoxide, the steam-methane reforming reaction for producing hydrogen, and methane reforming with carbon dioxide to produce carbon monoxide and hydrogen.

The general embodiment of this invention can be used to operate each of these reactions by simply substituting the proper feedstock, adsorbent, catalyst, the relative proportion of catalyst and adsorbent residing in the reactor, the reaction conditions and purge fluids to provide the desired products. For example, the reverse water gas shift reaction for producing carbon monoxide contemplates reacting a feedstock of carbon dioxide and hydrogen to produce carbon monoxide and water. The more adsorbable product with respect to the adsorbent is water such that the less adsorbable product, carbon monoxide, can be collected at feedstock pressure.

Suitable adsorbents for conducting the reverse water gas shift reaction to the present invention include zeolites such as X, A, Y and the mordenites, silica gel, and aluminas such as Alcan AA300 and AA230 which are commercially available from Alcan Corporation, Cleveland, Ohio. Suitable catalysts include conventional water gas shift catalysts such as the iron-chromium high temperature shift catalyst from ICI Corporation, Oakbrook Terrace, Ill., K6-10 and K6-11 catalysts available from BASF as R3-11 and K3-110 catalysts which are also commercially available from BASF Corporation, Geismer, La. Reaction conditions include a temperature ranging from 200° to 600° C., the first pressure which ranges from 2 to 50 bar and the second pressure which ranges from 0.05 bar to 2 bar. The weakly adsorbing purge fluid is selected from the group consisting of methane, hydrogen, nitrogen and carbon dioxide.

The feedstock for the steam-methane reforming reaction comprises water and methane with a ratio of water to methane ranging from 1.5 to 30 when the more adsorbable product is primarily carbon dioxide and from 1 to 1.5 when the more adsorbable product is primarily carbon monoxide. The less adsorbable product is hydrogen in both cases. Reaction conditions include a temperature ranging from 200° to 600° C., the first pressure which ranges from 2 to 50 bar and the second pressure which ranges from 0.05 bar to 2 bar. The weakly adsorbing purge fluid is selected from the group consisting of methane, steam, hydrogen and nitrogen.

Suitable catalysts for conducting the steam-methane reforming reaction include conventional steam-methane reforming and prereforming catalysts such as nickel-alumina, nickel-magnesium alumina and the noble metal catalysts. The adsorbent can be selected to adsorb carbon monoxide, carbon dioxide or a mixture of carbon monoxide and carbon dioxide. For example, adsorbents for carbon dioxide include the metal oxides and mixed metal oxides of magnesium, manganese, lanthanum and calcium and the clays minerals such as sepiolite and dolomite. Adsorbents which are selective toward carbon monoxide include $Cu^{+1}$ on silica-alumina and $Ag^{+1}$ on silica-alumina as described in U.S. Pat. Nos. 4,019,879 and 4,019,880.

Applicants have discovered two new classes of materials described herein as modified double layered hydroxides and non-modified and modified spinels which are capable of selectively adsorbing $CO_2$ from $CO_2$-containing streams containing moisture levels as high as 10 atmospheres of water vapor and which possess utility at temperatures ranging from 200° C. to 500° C., and possibly higher temperatures. The literature is not believed to teach adsorbents of the following types which are capable of selectively adsorbing $CO_2$ in the presence of large amounts of water under operating temperatures ranging from 200° C. to 500° C. and which are capable of being regenerated by purging with inert gas at such elevated temperatures.

The preferred modified double layered hydroxides which possess utility as $CO_2$ adsorbents under the above-referenced conditions are represented by the formula:

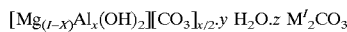

wherein 0.09 ≤ x ≤ 0.40;
0 ≤ y ≤ 3.5, 0 ≤ z ≤ 3.5;
M' = Na or K.

The spinels and modified spinels which possess utility as $CO_2$ adsorbents under the above-referenced conditions are represented by the formula $Mg[Al_2]O_4 \cdot y\ K_2CO_3$ wherein $0 \leq y \leq 3.5$. The modified spinets are identified by the materials wherein y is greater than zero. Thus, the spinels which are not modified are represented by the formula wherein y equals zero.

Methane can be reformed with carbon dioxide to produce carbon monoxide and hydrogen. Thus, the feedstock comprises carbon dioxide and methane, the catalyst comprises a methane reforming or prereforming catalyst such as nickel-alumina, nickel-magnesium alumina and the noble metal catalysts such as rhodium, ruthenium and iridium. The more adsorbable product with respect to the adsorbent may be hydrogen and the less adsorbable product may be carbon monoxide. Alternatively, the more adsorbable product may be carbon monoxide and the less adsorbable product may be hydrogen. Suitable adsorbents for hydrogen include the hydrogen-metal alloys such as palladium, palladium-silver, magnesium-nickel, iron-titanium and lanthanum-nickel, and the like. Suitable adsorbents for carbon monoxide include $Cu^+$ and $Ag^+$ salts. Reaction conditions comprise a temperature ranging from 200° to 600° C., the first pressure which ranges from 2 to 50 bar and the second pressure which ranges from 0.05 to 2 bar. The weakly adsorbing purge fluid is selected from the group consisting of steam, methane, carbon dioxide, carbon monoxide, nitrogen, and hydrogen.

As shall become more apparent upon reading the Detailed Description of the Invention, Applicants' process overcomes problems associated with prior art processes by utilizing a novel series of reaction, adsorption and desorption steps to collect the less adsorbable product in substantially pure form under a relatively constant flow rate at feedstock pressure.

Carbon monoxide was used as the purge fluid and the pressurizing fluid.

Figure 4:
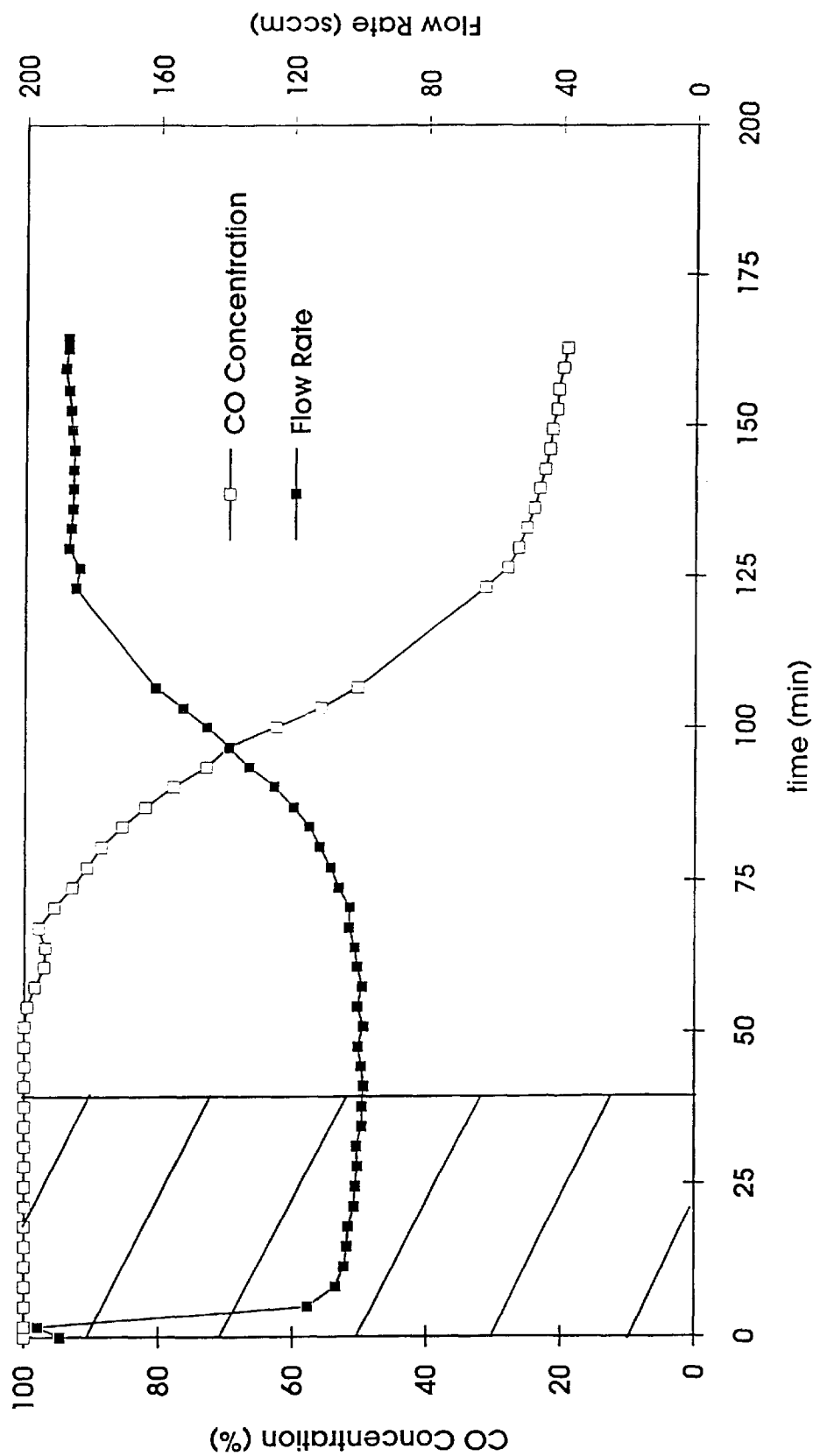

FIG. 4 illustrates the CO concentration profile and the flow rate of the reactor effluent for the reverse water gas shift reaction carried out according to the present process at 55 psig and 250° C. Carbon monoxide was used as the weakly adsorbing purge fluid and the pressurizing fluid.

Figure 5:
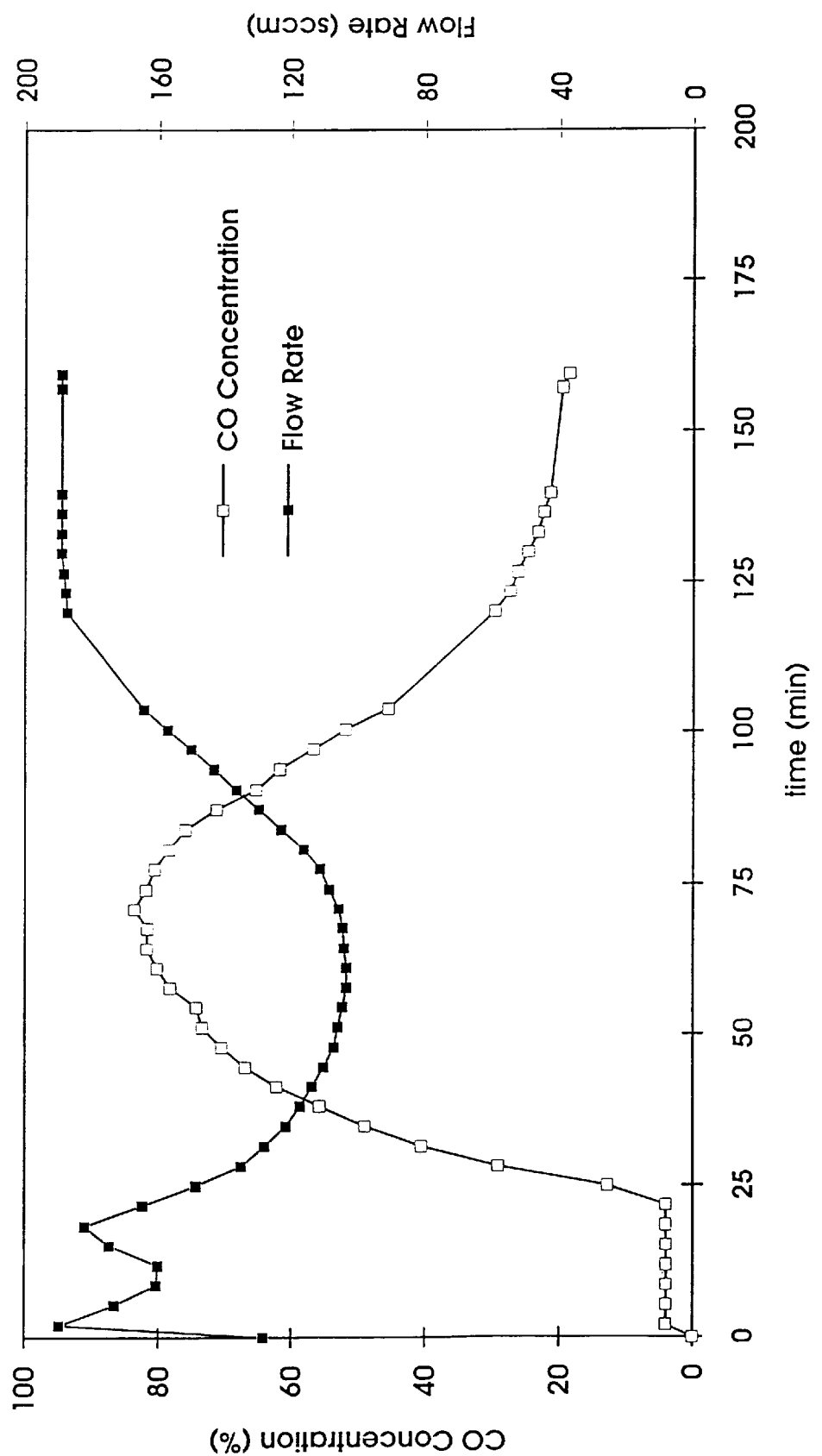

FIG. 5 illustrates the CO concentration profile and the flow rate of the reactor effluent for the reverse water gas shift reaction carried out according to the present process at 50 psig and 250° C. Carbon dioxide was used as the purge fluid and the pressurizing fluid.

Figure 6:
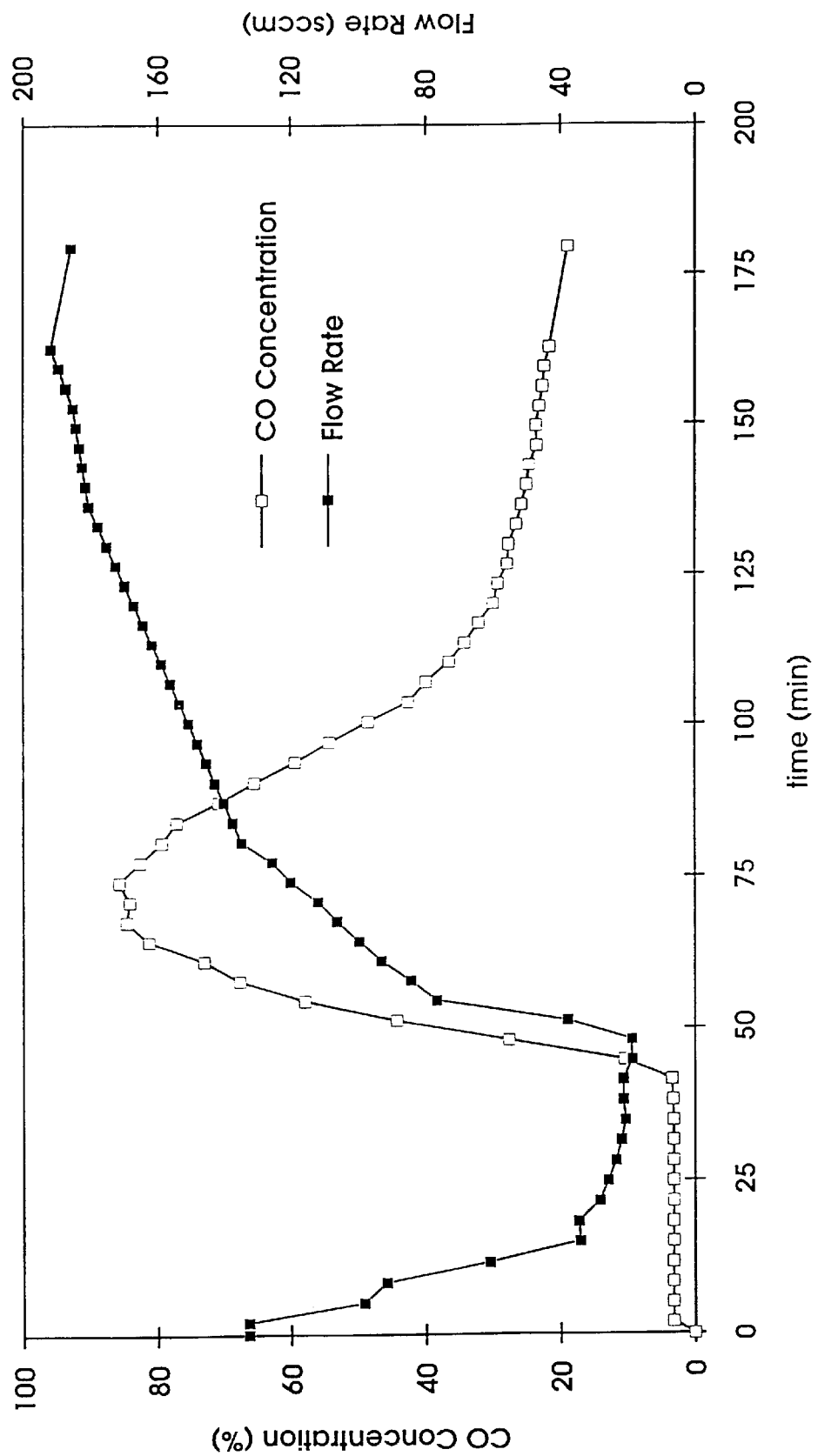

FIG. 6 illustrates the CO concentration profile and the flow rate of the reactor effluent for the reverse water gas shift reaction carried out at 50 psig and 250° C. Hydrogen was used as the purge fluid and the pressurizing fluid.

Figure 7:
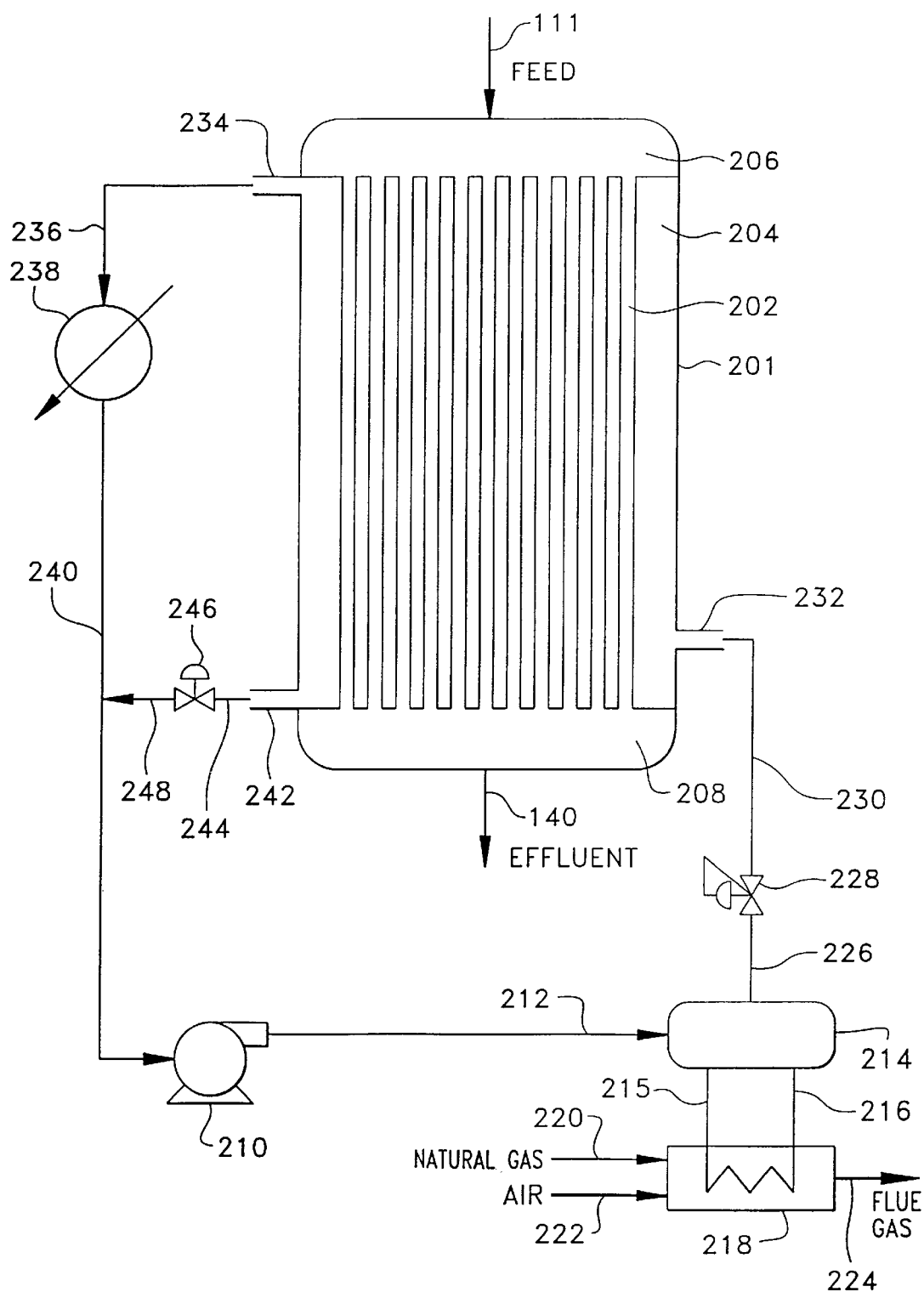

FIG. 7 illustrates one of a plurality of reactors suitable for practicing the claimed process for operating an equilibrium controlled reaction which comprises a shell-and-tube configuration wherein an admixture of an adsorbent for preferentially adsorbing one reaction product over the other reaction products and a catalyst for performing the desired equilibrium controlled reaction are situated in the reactor tubes. The heating and cooling requirements in the moving reaction mass transfer zone of each reactor are provided by indirect heat exchange with a fluid capable of phase change at temperatures maintained in each reactor during sorpreaction, depressurization, purging and pressurization steps during each process cycle.

Figure 8:
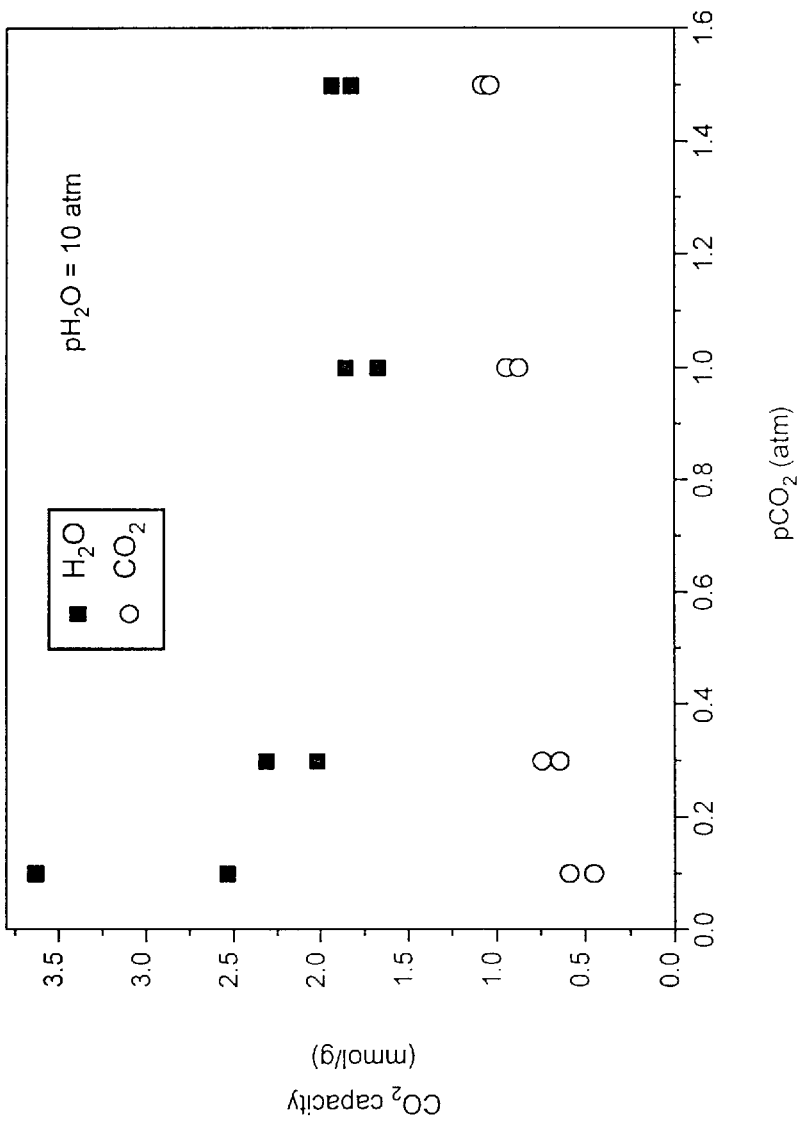

FIG. 8 presents a graph of $CO_2/H_2O$ isotherms for potassium carbonate modified double layered hydroxide, a preferred adsorbent for use in the claimed process for operating an equilibrium controlled reaction wherein the feedstock comprises water and methane, the more adsorbable product with respect to the adsorbent is carbon dioxide and the less adsorbable product is hydrogen.

DETAILED DESCRIPTION OF THE INVENTION

Applicants' will now discuss in greater detail their process for operating equilibrium controlled reactions which provides numerous benefits over prior art processes. Specifically, greater conversion of feedstock to products per unit volume of reactor is achieved; a more concentrated reaction product is obtained than could be achieved using a conventional process wherein the reaction stage is segregated from the product adsorption stage; and the process can be operated at less stringent conditions because very favorable equilibrium may not be required.

The present process also provides another additional benefit in that the less adsorbable product with respect to the adsorbent residing in admixture with the catalyst within each reactor may be collected at a relatively constant flow rate at feedstock pressure. This result is accomplished in part by countercurrently purging the reactor with the less adsorbable product until breakthrough of the less adsorbable product occurs at the feed end of each reactor. The extent to which purge is required is dictated by the extent of purity required in the less adsorbable product to be collected during the reaction step. Moreover, the reactor is countercurrently repressurized to the initial process pressure with the less adsorbable product prior to commencing the next process cycle within each reactor.

While removing the more adsorbable product from the reactor immediately as it is formed in the reaction zone does not change the equilibrium constant for the particular equilibrium controlled reaction, substantially increased conversion of feedstock to products is achieved by practicing the combined steps of the process. In order to effect this objective, two key requirements must be met: First, the adsorbent must be active at the reaction conditions meaning that the adsorbent must retain its capacity and selectivity for the more adsorbable product. Second, the adsorbent must be chemically neutral and must not act as a catalyst for undesirable side reactions.

Figure 1:
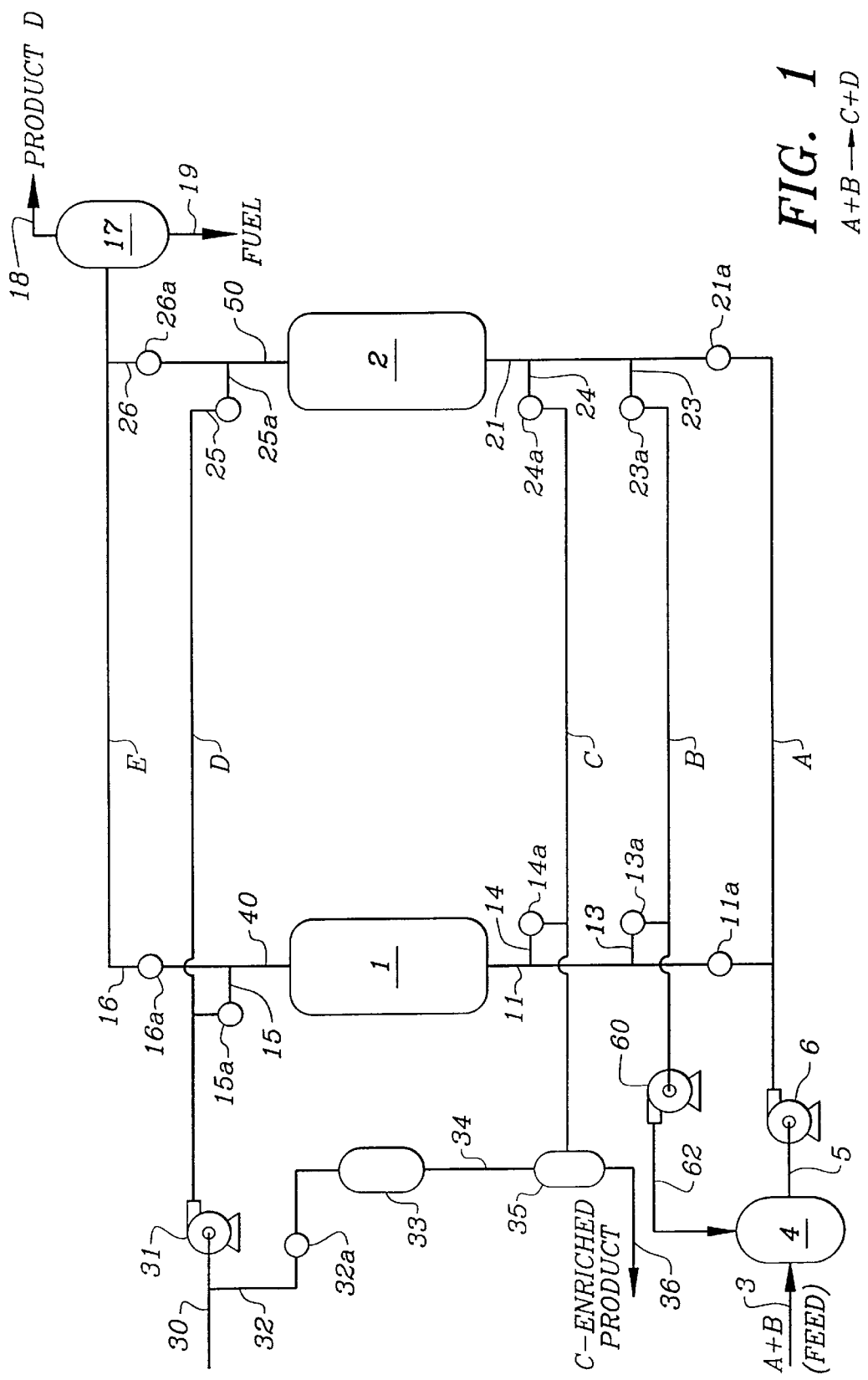
FIG. 1 is a process flow diagram of a general embodiment of the present process for operating equilibrium controlled reactions which utilizes two reactors containing an admixture of catalyst and adsorbent, wherein the reactors are operated in a cycle of predetermined sequence.

The general embodiment of Applicant's process for operating equilibrium controlled reactions is described in FIG. 1 which utilizes two reactors each containing an admixture of catalyst and adsorbent chosen for the desired equilibrium controlled reaction. Such reactors are described in greater detail in the Specification and FIG. 7. The schematic according to FIG. 1 consists of reactors 1 and 2; numerous control valves; manifolds A through E; pumps 6, 31 and 60; separators 17 and 35; and storage tanks 4 and 33. Feedstock comprising the reactants to be subjected to the desired equilibrium controlled reaction is drawn from storage tank 4 having inlet line 3 and outlet line 5 via pump 6 wherein the pressurized feedstock is introduced into manifold A.

Manifold A is in flow communication with branch inlet lines 11 and 21 which are connected to the inlet ends of reactors 1 and 2. Lines 11 and 21 are equipped with valves 11a and 21a, respectively. Opening of the appropriate valve permits the pressurized feedstock to flow through manifold A into the selected reactor being initially placed on stream. Thus, by opening valve 11a, while valve 21a is closed, feedstock may be caused to flow from manifold A, through line 11 and into reactor 1.

Reactors 1 and 2 are fitted at their respective outlet ends with lines 40 and 50 respectively, each equipped with control valves 16a and 26a, respectively. Lines 40 and 50 are operatively connected to manifold E via lines 16 and 26 through which a stream containing a mixture of components withdrawn from reactors 1 and 2 can be collected in separator 17. The mixture can be separated such that a stream containing the less adsorbable product, referred to as Product D, can be collected via line 18 and residuals may be collected via line 19 for fuel value or recycle. Thus, by opening the appropriate valve 16a or 26a, a mixture containing the less adsorbable product, product D, is caused to flow from the corresponding reactor through lines 40 and 16 or lines 50 and 26 into manifold E for passage into separator 17.

Reactors 1 and 2 are operatively connected to lines 11 and 21, each of which is in flow communication with lines 13 and 23. Lines 13 and 23 are provided with control valves 13a and 23a, respectively, such lines being in flow communication with manifold B. Manifold B can be placed in flow communication with reactor 1 or 2 via lines 13 and 23 upon opening valve 13a or 23a, respectively. Manifold B is also in flow communication with pump 60 which is connected to line 62 which can be used to recycle feedstock to storage tank 4.

Manifold C is in flow communication with reactors 1 and 2 via lines 14 and 24, each line which is equipped with valves 14a and 24a, respectively. Reactor effluent from reactors 1 and 2 may be passed through lines 14 and 24 into manifold C for separation in separator 35 into a stream which is enriched in the more adsorbable product, referred to as Product C, and a stream comprising weakly adsorbing purge fluid which can be passed into storage tank 33 via line 34 for later use.

Manifold D is connected to pump 31 which receives various process fluids via lines 30 and 32. Such process fluids pass through line 30 or line 32 and are pressurized via pump 31. The pressurized fluids may be passed through manifold D which is in flow communication with reactors 1 and 2 via lines 15 and 25, respectively. Lines 15 and 25 are each fitted with valves 15a and 25a such that the flow of streams from Manifold D into reactors 1 and 2 can be controlled. Moreover, weakly adsorbing purge fluid from tank 33 can be transferred to pump 31 via lines 32 and 30 by opening valve 32a.

Operation of the embodiment represented in FIG. 1 will now be explained in connection with an arbitrarily chosen cycle having eight timed periods of ten minutes per period as set forth in Table 1. Although not limited thereto, the process as illustrated in FIG. 1 utilizes two reactors which are operated in cycle according to a predetermined timed sequence. Other arrangements using fewer or a greater number of reactors and the associated gas manifolds and switch valves may be employed, optionally using interrupted or discontinuous operation (using idling) of pumps. Other arrangements using more than two reactors may be employed by appropriate sequencing of the individual steps or periods of the process cycle.

TABLE 1

Mode I:

| STEPS | TIME Minutes | 11a | 13a | 14a | 15a | 16a | 32a | 21a | 23a | 24a | 25a | 26a | 32a | STEPS Reactor-Sorber II |
|---|---|---|---|---|---|---|---|---|---|---|---|---|---|---|
| Sorpreaction | 0 to 10 | O | C | C | C | O | C | C | O | C | C | C | C | Depressurize |
| Sorpreaction | 10 to 20 | O | C | C | C | O | C | C | C | O | O | C | C | Purge I |
| Sorpreaction | 20 to 30 | O | C | C | C | O | C | C | C | O | O | C | C | Purge II |
| Sorpreaction | 30 to 40 | O | C | C | C | O | C | C | C | C | O | C | C | Pressurize |
| Depressurize | 40 to 50 | C | O | C | C | C | C | O | C | C | C | O | C | Sorpreaction |
| Purge I | 50 to 60 | C | C | O | O | C | C | O | C | C | C | O | C | Sorpreaction |
| Purge II | 60 to 70 | C | C | O | O | C | C | O | C | C | C | O | C | Sorpreaction |
| Pressurize | 70 to 80 | C | C | C | O | C | C | O | C | C | C | O | C | Sorpreaction |

According to the general embodiment of FIG. 1, each of the reactors 1 and 2 undergo four periods of the reaction/adsorption step, referred to as the sorpreaction step, one period of the depressurization step, one period of the Purge I step, one period of the Purge II step, and one period of the pressurization step. As illustrated in Table 1, the steps undertaken at startup in each of reactors 1 and 2 are staggered to enable at least one of the two reactors to undergo the sorpreaction step at all times during the process cycle. The operation of the invention described in FIG. 1 involves principally the following sequence of steps:

(a) SORPREACTION—feedstock at a first predetermined pressure is passed through the reactor containing an admixture of catalyst and adsorbent preferentially selective toward retention of the more adsorbable product, referred to as Product C, wherein an effluent stream enriched in the less adsorbable product, referred to as Product D, is withdrawn from the reactor. Product C is selectively adsorbed by the adsorbent and a reaction mass transfer zone (RMTZ) is formed inside the reactor which moves toward the outlet or discharge end of the reactor as more feedstock is passed through the reactor. The adsorbent at the leading edge of the RMTZ is essentially free of the more adsorbable product while the trailing edge of the RMTZ is equilibrated with the more adsorbable product at the local conditions. The sorpreaction step is continued until the adsorbent in the reactor is essentially saturated with Product C. In other words, the RMTZ has reached the effluent end of the reactor or somewhat short of it. The effluent gas, rich in Product D, is discharged from the reactor.

(b) DEPRESSURIZATION—the reactor is countercurrently depressurized to a second predetermined pressure by withdrawing a mixture comprising unreacted feedstock, a portion of the more adsorbable product and a portion of the less adsorbable product. The depressurization step is continued until the reactor reaches the second predetermined pressure.

(c) PURGE I—the reactor is countercurrently purged at the second pressure with a weakly adsorbing purge fluid with respect to the adsorbent to desorb Product C from the adsorbent and a mixture comprising unreacted feedstock, a portion of Product C and a portion of Product D is withdrawn from the reactor.

(d) PURGE II—the reactor is countercurrently purged at the second pressure with Product D to desorb the weakly adsorbing purge fluid and a mixture comprising the weakly adsorbing purge fluid, a portion of Product C and a portion of Product D is withdrawn from the reactor.

(e) PRESSURIZATION—the reactor is countercurrently pressurized from the second pressure to the first pressure with Product D prior to commencing another process cycle within the reactor.

The valve positions during the above-mentioned operating cycle are also set forth in Table 1. The designation "O" indicates that a specified valve is open while a "C" represents that a specified valve is closed. The operative sequence of steps occurring in reactor 1 during a complete process cycle will now be described in exhaustive detail so that operation of a continuous process will be fully understood. The identical sequence of steps according to Table 1 occurs in staggered sequence in reactor 2.

Again, referring to the embodiment disclosed in FIG. 1 and the sequence periods and valve positions designated in Table 1, reactor 1 undergoes four sequence periods of the sorpreaction step. Feedstock comprising reactants A and B, stored in storage tank 4, is introduced into reactor 1 by opening valves 11a and 16a and closing valves 13a, 14a and 15a thereby allowing feedstock to flow through manifold A, line 11 and into reactor 1 which contains an admixture of a desired catalyst and an adsorbent preferentially selective toward the more adsorbable product, Product C.

The sorpreaction is continued until reactor 1 is essentially saturated with adsorbed Product C. Product C is selectively adsorbed onto the adsorbent and a reaction mass transfer zone (RMTZ) is formed within reactor 1 which moves toward the discharge end of reactor 1 as more feedstock is passed. The sorpreaction is completed when the MTZ reaches the effluent end of the reactor or somewhat short of it by a predetermined set point.

A mixture which is enriched in the less adsorbable product and depleted in the more adsorbable product as well as unreacted feedstock exits the discharge end of reactor 1 via lines 40 and 16 and flows into manifold E for collection in separator 17. Optionally, the mixture in separator 17 can be separated by conventional techniques such as pressure swing adsorption, thermal swing adsorption or distillation or condensation to form a stream comprising the less adsorbable product, Product D, which is discharged from separator 17 via line 18 and the remainder of the components of the mixture are discharged via line 19.

The process proceeds with one period of the depressurization step wherein reactor 1 is countercurrently depressurized to a second predetermined pressure by withdrawing a mixture comprising unreacted feedstock, a portion of the more adsorbable product and a portion of the less adsorbable product from the inlet end of reactor 1. Valve 13a is opened while valves 11a and 14a remain closed allowing the mixture to be passed through lines 11 and 13 into manifold B and in flow communication with pump 60. The mixture exits the discharge end of pump 60 proceeding via line 62 for use as fuel (not shown) or recycle into storage tank 4 for use as feedstock in a subsequent process cycle. The depressurization step is continued until the reactor reaches the second predetermined pressure.

Reactor 1 is then subjected to one period of the purge I step. Reactor 1 is countercurrently purged at the second pressure with a weakly adsorbing purge fluid with respect to the adsorbent. Upon opening valves 14a and 15a while valves 25a and 32a remain in the closed position, weakly absorbing purge fluid from an external source passes through pump 31 via line 30 and exits pump 31 at the second pressure to proceed via manifold D, line 15 and line 40 into the exit end of reactor 1. A mixture comprising unreacted feedstock, weakly adsorbing purge fluid, a portion of Product C and a portion of Product D is withdrawn from reactor 1 via line 11, line 14 and manifold C and is collected in separator 35. This mixture may be used as fuel, discharged for use outside the process or separated in separator 35 to form a stream of weakly adsorbing purge gas. A portion of the weakly adsorbing purge fluid may be transferred through line 34 into storage tank 33 for future use. Upon demand via opening valve 32a, weakly adsorbing purge fluid may be drawn to pump 31 via lines 32 and 30 for use in subsequent process cycles.

Reactor 1 is then subjected to one period of the purge 11 step wherein reactor 1 is countercurrently purged with the less adsorbable product, Product D. Upon opening valves 14a and 15a while valves 25a and 32a remain in the closed position, the less adsorbable product from an external source passes through pump 31 via line 30 and exits pump 31 at the second pressure to proceed via manifold D, line 15 and line 40 into the exit end of reactor 1. A mixture comprising unreacted feedstock, a portion of Product C and a portion of Product D is withdrawn from reactor 1 via line 11, line 14 and manifold C and is collected in separator 35. This mixture may be used as fuel, discharged for use outside the process or separated in separator 35 to form a stream of the weakly adsorbing purge fluid which may be transferred through line 34 into storage tank 33 for future use. Upon demand via opening valve 32a, such weakly adsorbing purge fluid may be drawn to pump 31 via lines 32 and 30 for use in subsequent process cycles.

The final step of the process cycle involves a single sequence of the pressurization step wherein reactor 1 is countercurrently pressurized from the second pressure to the first pressure with Product D prior to commencing another process cycle within the reactor. Specifically, upon opening valve 15a while valves 11a, 13a, 14a, 25a and 32a remain in the closed position, the less adsorbable product passes through pump 31 via line 30 and exits pump 31 at the second pressure to proceed via manifold D, line 15 and line 40 into the exit end of reactor 1. This step is stopped when reactor 1 reaches the first pressure.

The process proceeds through additional cycles according to the abovementioned steps enumerated in Table 1. While the sequence periods are depicted as being of equal length, this is neither required or necessary. The times will be set by allowable maximum gas flow rates, valve and line sizes and the properties of the adsorbent used. Alternate routines may be employed for establishing the duration of each of the cycle steps. For example, the end of a particular step may be determined by other techniques known in the art such as by analysis of the composition of the reactor effluent.

FIG. 7 presents a detailed description of reactors 1 and 2 as presented in FIG. 1. The reactor design and operating scheme are particularly suited toward use in practicing the claimed invention. Reactor 201 depicts a conventional stainless steel shell-and-tube reactor. An admixture of the catalyst suitable for catalyzing the desired equilibrium controlled reaction and the adsorbent for preferentially adsorbing the more adsorbable reaction product is loaded into a plurality of tubes 202. A plurality of shell elements 204 formed between adjacent tubes 202 receives a heat transfer fluid capable of phase change which is selected to undergo such phase change at the desired operating temperature of the desired equilibrium controlled reaction being carried out in the tubes 202.

The reactor 201 is preferentially designed to operate net endothermic reactions although the reactor is also well suited to operate net exothermic equilibrium controlled reactions. Net endothermic reactions are defined as those equilibrium controlled reactions in which heat must be added to the reactor to carry out the sorpreaction step because the endothermic heat of reaction of the equilibirum controlled reaction is greater than the energy liberated by the exothermic adsorption of the more adsorbable product.

The feedstock for a particular equilibrium controlled reaction is fed into port 111 of reactor 201 and into a gas distributor 206 at the desired feed rate, pressure and temperature before entering the tubes 202. The feed gas is contacted with the admixture of adsorbent for the more adsorbable product and desired catalyst residing in tubes 202 under reaction conditions sufficient to convert the feedstock to a mixture of a more adsorbable product, a less adsorbable product and unreacted feedstock. The feedstock reacts with the catalyst as the feedstock flows through tubes 202 and the more adsorbable product is adsorbed onto the adsorbent.

The region of the tubes 202 in which simultaneous reaction and adsorption occurs is referred to as the reaction mass transfer zone (RMTZ). The more adsorbable product is removed from the reaction zone by adsorption onto the adsorbent and the less adsorbable product exits tubes 202 into a gas collection zone 208. The less adsorbable product is collected until the RMTZ proceeds to a point wherein the purity of the less adsorbable product diminishes to a preset level at which time the flow of feedstock into reactor 201 is stopped and diverted to an alternate reactor of the plurality of reactors being utilized in the process. The less adsorbable product is withdrawn as an essentially pure product from port 140.

When the overall sorpreaction step is endothermic (endothermic heat of reaction is greater than the exothermic heat of adsorption), the RMTZ moving through the reactor requires heat input to maintain the reactor temperature. The heat transfer fluid (HTF) vapor which is capable of phase change under process operating conditions enters port 232 of reactor 201 and fills shells 204 which are isolated from tubes 202. The pressure within the shells is controlled to the saturation pressure of the HTF at the desired reaction temperature. When the reaction occurring within the tubes 202 is endothermic, the temperature in the RMTZ within the tube begins to decrease as the reaction proceeds. Below the dew point of the HTF vapor, the vapor condenses on the outer wall of the tubes 202 into a liquid at the same temperature and the vapor liberates the heat of condensation. The heat released from condensation of the HTF vapor travels through the tube walls and heats the reactants, catalyst and adsorbent within the RMTZ contained in tubes 202.

As the RMTZ moves along the reaction tubes, HTF vapor continuously condenses outside the tubes at the RMTZ thereby providing heat to maintain the RMTZ at an approximately constant temperature. The HTF vapor condenses only at the location where heat is required (at the RMTZ). The condensed HTF is collected at the bottom of the shell side and is withdrawn periodically or continuously through port 242 and line 244 by opening valve 246 into line 248. The liquid level in the reactor shell side is always maintained below the level of port 232.

A small amount of HTF vapor is continuously withdrawn from port 234 at the top of the reactor and is transported to condenser 238 via line 236. The condensed HTF from the condenser 238 in line 240 is combined with the condensed HTF withdrawn from the reactor via line 248. The combined HTF liquid is pumped through a liquid pump 210 via line 212 into a HTF vaporizer drum 214 which is part of the HTF vaporizer system consisting of the vaporizer drum 214 and the heater or furnace 218. The HTF in drum 214 is continuously fed as liquid into the heater 218 via line 215.

Heater 218 is a conventional radiant heat exchange system in which heat is provided by combusting natural gas via line 220 and air via line 222. The combustion of natural gas produces a flue gas which is discharged from vent 224. The transfer tubes or coils 215 and 216 are contained in the radiant section of the furnace 218. The heat generated in the furnace is used to vaporize a portion of the HTF liquid and the vapor and liquid mixture is recirculated into the HTF vaporizer drum 214 via line 216. The HTF vapor in drum 214 is fed to the reactor shell side via lines 226 and 230 and through port 232. A forward pressure regulator 228 maintains the HTF vapor on the reactor shell side at a fixed pressure. The vapor in the shells 204 is maintained at 50–500 psig and at a temperature typically in excess of 100° C. As the HTF vapor condenses due to heat flux requirements in the tubes 202, the HTF vapor pressure on the reactor shell side decreases, and the pressure regulator 228 opens to release more HTF vapor via line 230 and port 232 into the shells. Thus, the reactor can be maintained at nearly isothermal conditions by circulating the HTF liquid and vapor as previously described.

At the end of the reaction sequence, the feed to the reactor is discontinued by closing the inlet valve at port 111 and the outlet valve at port 140. The valve sequencing described in Table 1 is followed during regeneration of the adsorbent in the reactor. Regeneration of the adsorbent in reaction tubes 202 is done countercurrently to the direction of the feedstock flow in the first step of the process. First the reactor is depressurized by opening port 111 so that the pressure in the reactor is decreased from the first pressure to the second pressure as described in the general embodiment. The HTF vapor provides the heat to compensate for the cooling associated with conducting the depressurization step of the process.

The purging step is conducted next wherein a weakly adsorbing purge fluid is introduced through port 140 into the gas collection zone 208 and the tubes 202 to desorb the more adsorbable product from the adsorbent. The step is endothermic and heat and mass transfer zones are formed which move through tubes 202 in a direction countercurrent to the feedstock flow in the first step of the process. The HTF vapor condenses on the tube surface at the location of the heat or mass transfer zone and provides heat to the reactor in order to maintain the tubes at essentially constant temperature during this desorption step. Once the mass transfer zone has countercurrently exited tubes 202, the flow of the weakly adsorbing fluid from port 140 is stopped.

The product purge steps are then performed wherein the product gas is introduced into the reactor tubes 202 from port 140. The product gas desorbs the weakly adsorbing gas from the adsorbent. As in all steps of the process, heat and mass transfer zones are formed in the reactor tubes 202 which move along the length of the reactor. Condensation of the HTF vapor in the shells 204 provides the energy for desorbing the weakly adsorbing fluid with the product gas. When the product gas mass transfer zone exits the reaction tubes, port 111 is closed and the pressure in the reactor tubes is allowed to increase to the reaction presssure with the product gas. At this point the regeneration cycle is complete and the reactor is ready for the reaction cycle.

Several fluids capable of phase change under reaction conditions are commericially available and can be selected by one of ordinary skill in the art without undue experimentation. Examples of such fluids include (i) Syltherm 800 from Dow Chemical Company (highly stable polydimethylsiloxane), (ii) Dowtherm A from Dow Chemical Company (a eutectic mixture of biphenyl oxide and diphenyl oxide)and (iii) Therminol VP-1 from Monsanto Company (eutectic mixture of 26.5% biphenyl oxide and 73.5% diphenyl oxide). These HTFs are capable of operating with film temperatures in excess of 425° C. For lower temperature operation, steam may be used as the phase change fluid which is capable of phase change. The maximum temperature for using steam in this application is about 300° C.

Applicants' cyclic process which draws its heating and cooling requirements via indirect heat exchange with a fluid capable of phase change under process operating conditions offers several advantages over prior art because (i) the condensing HTF vapor provides heat to the moving RMTZ allowing the SER reactor to operate isothermally, (ii) the zones behind and ahead of the RMTZ do not overheat, eliminating problems associated with tube or catalyst overheating, (iii) the inventory and circulation of heat transfer fluid is significantly reduced compared with conventional heat exchange where no phase change occurs.

Applicants have identified reactions which are particularly suited for operation using their claimed process. Preferred reactions include the reverse water gas shift reaction for producing carbon monoxide, the steam-methane reforming reaction for producing hydrogen, and methane reforming with carbon dioxide to produce carbon monoxide and hydrogen. The general embodiment of this invention can be used to operate each of these reactions by simply substituting the proper feedstock, adsorbent, catalyst, the relative proportion of catalyst and adsorbent residing in the reactor, the reaction conditions and purge fluids to provide the desired products. For example, the reverse water gas shift reaction for producing carbon monoxide contemplates reacting a feedstock of carbon dioxide and hydrogen to produce carbon monoxide and water. The more adsorbable product with respect to the adsorbent is water such that the less adsorbable product, carbon monoxide, can be collected at feedstock pressure.

Suitable adsorbents for conducting the reverse water gas shift reaction to the present invention include zeolites such as X, A, Y and the mordenites, silica gel, and aluminas such as Alcan AA300 and AA230 which are commercially available from Alcan Corporation, Cleveland, Ohio. Suitable catalysts include conventional water gas shift catalysts such as the iron-chromium high temperature shift catalyst from ICI Corporation, Oakbrook Terrace, Ill., K6-10 and K6-11 catalysts available from BASF Corporation, Geismer, La., and low and medium temperature shift catalysts such as R3-11 and K3-110 catalysts which are also commercially available from BASF Corporation, Geismer, La. Reaction conditions include a temperature ranging from 200° to 600° C., the first pressure which ranges from 2 to 50 bar and the second pressure which ranges from 0.05 bar to 2 bar. The weakly adsorbing purge fluid is selected from the group consisting of methane, hydrogen, nitrogen and carbon dioxide.

The feedstock for the steam-methane reforming reaction comprises water and methane in a stoichiometric ratio of water to methane ranging from 1.5 to 30 when the more adsorbable product is primarily carbon dioxide and from 1 to 1.5 when the more adsorbable product is primarily carbon monoxide. The less adsorbable product is hydrogen in both cases. Reaction conditions include a temperature ranging from 200° to 600° C., the first pressure which ranges from 2 to 50 bar and the second pressure which ranges from 0.05 bar to 2 bar. The weakly adsorbing purge fluid is selected from the group consisting of methane, steam, hydrogen and nitrogen.

Suitable catalysts for conducting the steam-methane reforming reaction include conventional steam-methane reforming and prereforming catalysts such as nickel-alumina, nickel-magnesium alumina and the noble metal catalysts. The adsorbent can be selected to adsorb carbon monoxide, carbon dioxide or a mixture of carbon monoxide and carbon dioxide. For example, preferential adsorbents for carbon dioxide include the metal oxides and mixed metal oxides of magnesium, manganese, lanthanum and calcium and the clays minerals such as sepiolite and dolomite. Adsorbents which are selective toward carbon monoxide include $Cu^+$ on silica-alumina and $Ag^+$ on silica-alumina as described in U.S. Pat. Nos. 4,019,879 and 4,019,880.

Applicants have discovered two new classes of materials described herein as modified double layered hydroxides and non-modified and modified spinels which are capable of selectively adsorbing $CO_2$ from $CO_2$-containing streams containing moisture levels above stoichiometric with respect to $CO_2$ and as high as 10 atmospheres of water vapor and which possess utility at temperatures ranging from 200° C. to 500° C., and possible higher temperatures. The literature is not believed to teach adsorbents of the following types which are capable of selectively adsorbing $CO_2$ in the presence of large amounts of water under operating temperatures ranging from 200° C. to 500° C. and which are capable of being regenerated by purging with inert gas at such elevated temperatures.

The modified double layered hydroxides which possess utility as $CO_2$ adsorbents under the above-referenced conditions are represented by the general formula:

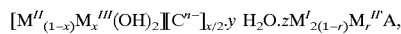

wherein $M^I$=$Li^+$, $Na^+$, $K^+$, $Cr^+$ or $Rb^+$, and mixtures thereof;
$M^{II}$=$Mg^{2+}$, $Ca^{2+}$, $Mn^{2+}$, $Fe^{2+}$, $Co^{2+}$, $Ni^{2+}$ or $Zn^{2+}$, and mixtures thereof;
$M^{II'}$=$Mg^{2+}$, $Ca^{2+}$, $Sr^{2+}$, $Ba^{2+}$, $Zn^{2+}$
$M^{III}$=$Al^{3+}$, $Cr^{3+}$, $Mn^{3+}$, $Co^{3+}$, $Ni^{3+}$ or $La^{3+}$, and mixtures thereof;

$C^{n-}$=$NO_3^-$, $SO_4^{2-}$, $CO_3^{2-}$, $CH_3CO_2^-$, $Cl^-$, $Br^-$, $F^-$ or $I^-$ and A=$O^{2-}$ or $CO_3^{2-}$;

wherein n=1, 2 x=0.01 to 0.99;

y=0 to 4;

z=0.01 to 7; and r=0 to 1.

Preferred modified double layered hydroxides are represented by the formula:

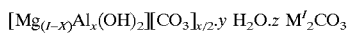

wherein $0.09 \leq x \leq 0.40$ $0 \leq y \leq 3.5$, $0 \leq z \leq 3.5$ and $M^I$=Na or K.

The modified and non-modified spinels which possess utility as $CO_2$ adsorbents under the above-referenced conditions are represented by the generic formula:

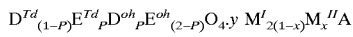

in which "Td" indicates cation occupation of tetrahedral lattice site and "oh" indicates cation occupation of octahedral lattice site, $D^{Td}$ and $D^{oh}$ are metal cations or a combination of metal cations chosen from groups I-A, II-A, III-A, IV-A, V-A, I-B, II-B, IV-B, V-B, VI-B, VII-B and VIII of the periodic table of the elements;

$E^{Td}$ and $E^{oh}$ are individually selected metal cations selected from groups I-A, III-A, IV-A, V-A, I-B, II-B, IV-B, V-B, VI-B, VII-B, VIII of the periodic table of the elements;

such that the value of the octahedral to tetrahedral bond length ratio, R, of the metal cations $D^{Td}$, $E^{Td}$, $D^{oh}$ and $E^{oh}$ falls within the range of $1.155 > R > 0.886$, wherein $M^I$=$Li^+$, $Na^+$, $K^+$, $Cs^+$, $Rb^+$ $M^{II}$=$Mg^{+2}$, $Ca^{+2}$, $Sr^{+2}$, $Zn^{+2}$, $Ba^{+2}$ X=0 to I; A=$O^{2-}$, $CO_3^{2-}$ and Y=0 to 7.

Preferred spinels which are suitable for use as $CO_2$ adsorbent under high temperatures in the presence of large amounts of water are represented by the formula $Mg[Al_2]O_4 \cdot y\ K_2CO_3$ wherein $0 \leq y \leq 3.5$.

Methane can be reformed with carbon dioxide to produce carbon monoxide and hydrogen. Thus, the feedstock comprises carbon dioxide and methane, the catalyst comprises a methane reforming or prereforming catalyst such as nickel-alumina, nickel-magnesium alumina and the noble metal catalysts such as rhodium, ruthenium and iridium. Suitable adsorbents for hydrogen include the hydrogen-metal alloys such as palladium, palladium-silver, magnesium-nickel, iron-titanium and lanthanum-nickel, and the like. Suitable adsorbents for carbon monoxide include $Cu^+$ and $Ag^+$ salts. The more adsorbable product with respect to the adsorbent may be hydrogen and the less adsorbable product may be carbon monoxide. Alternatively, the more adsorbable product may be carbon monoxide and the less adsorbable product may be hydrogen. Reaction conditions comprise a temperature ranging from 200° to 600° C., the first pressure which ranges from 2 to 50 bar and the second pressure which ranges from 0.05 to 2 bar. The weakly adsorbing purge fluid is selected from the group consisting of steam, methane, carbon dioxide, carbon monoxide, nitrogen, and hydrogen.

While removing the more adsorbable product from the reactor immediately as it is formed does not change the equilibrium constant for the particular equilibrium controlled reaction, substantially increased reactor throughput is achieved by practicing the combined steps of the process. In order to effect this objective, two key requirements must be met: First, the adsorbent must be active at the reaction conditions meaning that such the adsorbent must retain its capacity and selectivity for the more adsorbable product. Second, the adsorbent must be chemically neutral and must not act as a catalyst for the desired equilibrium controlled reaction.

The ratio by weight of catalyst and adsorbent can be widely varied depending upon the particular requirements of a particular catalyzed equilibrium controlled reaction to be operated under the present invention. As stated earlier in the Specification, the general and alternate embodiments of the present invention are suitable for operating equilibrium controlled reactions which are capable of being operated in the absence of a catalyst. No special techniques are required to prepare the admixture of catalyst and adsorbent to be placed in each reactor. The catalyst and adsorbent are simply mixed together by conventional means in order to disperse the catalyst and adsorbent. The catalyst and adsorbent to be mixed should desirably possess compatible average particle sizes such that the catalyst and adsorbent do not segregate into domains during operation of the process.

The term, weakly adsorbing fluid, refers to a fluid which is capable of displacing the product which is adsorbed by the adsorbent during operation of the process and which can then be desorbed by the less adsorbing product such that subsequent process cycles can be conducted in each reactor. One of ordinary skill in the art can readily select one or a mixture of weakly adsorbing fluids suitable for use in the claimed invention.

The general and alternate embodiments of the present invention can be operated using conventional hardware. For example, suitable reactors include any vessel which is capable of being subjected to the reaction conditions required to practice a particular equilibrium controlled process such as shell and tube reactors. Moreover, the separators enumerated in the process are readily selected by one of ordinary skill in the art based upon considerations such as the particular mixtures to be separated, the volume of fluids to be separated and the like.

The following examples are provided to further illustrate Applicants' process for operating equilibrium controlled reactions. The examples are illustrative and are not intended to limit the scope of the appended claims.

EXAMPLE 1

Reverse Water-Gas Shift Reaction for Producing Carbon Monoxide

The reverse water-gas shift reaction for manufacturing carbon monoxide was theoretically evaluated in order to test Applicants' process for controlling equilibrium controlled reactions. The process is represented by the reaction

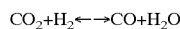

and is especially of interest because the reaction is typically performed at a high temperature (>800° C.) because it results in low equilibrium conversions at lower temperatures (especially at <500° C.). The process is further complicated by side reactions at high temperatures which result in the formation of carbon which deactivates the catalyst. Calculations performed using temperature versus thermodynamic equilibrium constant data found in the literature indicate that if an adsorbent such as NaX zeolite could be used to remove 99.9% of the water formed in the reaction zone, conversions of greater than 80% would be possible at about 300° C.

Applicants experimentally tested the general embodiment of their invention using the reverse water gas shift reaction as a representative equilibrium controlled reaction. The process was operated under the following conditions: Reaction Temperature=275° C.; Reaction Pressure=57 psig; $H_2$ flow rate=100 cc/min; $CO_2$ flow rate=100 cc/min; 1:1 (by weight) physically admixed low temperature shift catalyst and NaX zeolite adsorbent pellets; Gas in reactor prior to admission of reactants=CO at 57 psig and 275° C.; Total moles CO in reactor system prior to introduction of reactants=0.17 gram mole.

Figure 2:
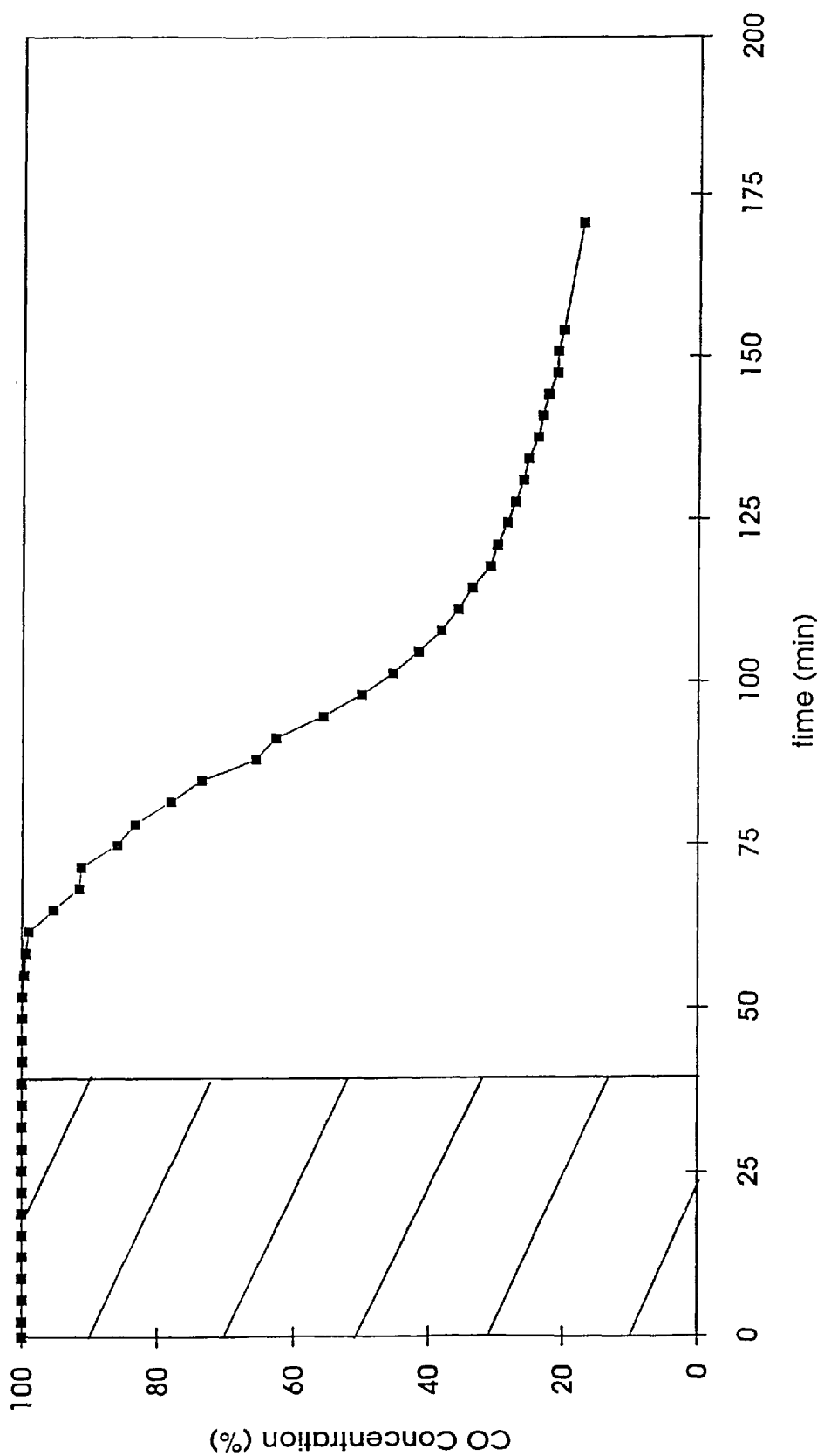
FIG. 2 illustrates the CO concentration profile in reactor effluent versus time for the reverse water gas shift reaction carried out according to the present process at 57 psig and 275° C. Carbon monoxide was used as the purge fluid and the pressurizing fluid.

In the first step of the process, the feedstock was introduced into the reactor which was pre-saturated with one of the product gases, carbon monoxide, at 275° C. and 57 psig. The process was carried out under the above-mentioned conditions. For the first 70 minutes, the effluent stream consisted of CO only. FIG. 2 illustrates the CO concentration profile in reactor effluent versus time for the reverse water gas shift reaction. The hatched area of the diagram represents the carbon monoxide effluent from the reactor which is equivalent to the quantity of carbon monoxide present in the reactor at the start of the process. This amount of carbon monoxide left the reactor in the first 38 minutes of the operation. Furthermore, the diagram illustrates that essentially pure carbon monoxide was produced from the reactor during the time span between about 38 minutes and 78 minutes. This essentially pure carbon monoxide effluent, which requires minimal cleanup to remove the small amount of impurities in the effluent, was the net essentially pure carbon monoxide produced by the concept of the present invention. This product CO is produced at the feedstock pressure of 57 psig.

Figure 3:
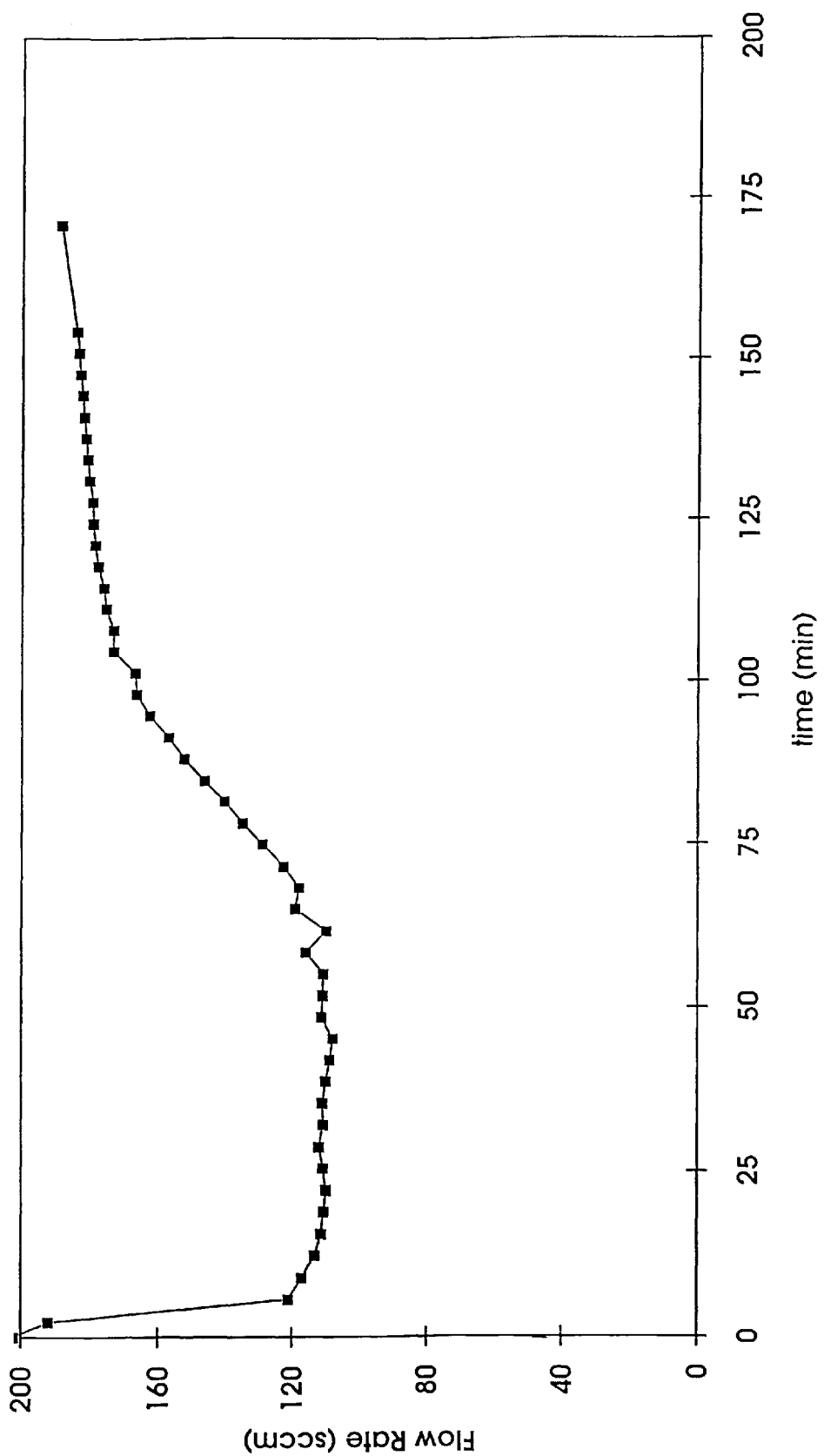
FIG. 3 illustrates the reactor effluent flow rate versus time for the reverse water gas shift reaction carried out according to the present process at 57 psig and 275° C.

FIG. 3 illustrates the reactor effluent flow rate versus time for the reverse water gas shift reaction of Example 1. The effluent flow rate was relatively constant during the period of 38 to 78 minutes when the carbon monoxide product is produced. The initial step may be carried on for varying amounts of time: the reaction step is preferably stopped after 71.7 minutes to provide a product stream containing 98% carbon monoxide or 78.3 minutes to obtain a product stream containing 97% carbon monoxide. In the second step the reactor was countercurrently depressurized to 10 psig to release a mixture of CO, $CO_2$, $H_2$ and $H_2O$. In the third step the bed was countercurrently purged with a weakly adsorbing purge fluid, methane, at 275° C., at a pressure of 10 psig and a flow rate of 1600 cc/min. in order to desorb the remaining water from the adsorbent-catalyst admixture. In the fourth step of the process, the reactor was countercurrently purged with carbon monoxide to desorb the weakly adsorbing purge fluid and other fluids remaining in the reactor. Finally, in the fifth step, the reactor was countercurrently pressurized to 57 psig with carbon monoxide.

The usable conversion of carbon dioxide to carbon monoxide was 60.6% for reactor effluent containing 97% carbon monoxide and 56.0% for reactor effluent containing 98% purity.

EXAMPLE 2 (COMPARATIVE)

Equilibrium Conversion Estimation for Conventional Reverse Water-Gas Shift Reaction for Producing Carbon Monoxide Equilibrium conversion was estimated based on thermodynamic data for a conventional reverse water gas shift reaction at different reaction temperatures. The calculatons show that at the reaction temperature of 275° C. according to Example 1, the equilibrium conversion in the absence of the adsorbent is only 11.0%. In order to achieve conversion of 60.6% according to Example 1, the reaction would need to be carried out at 1150° C. This points to the significant reduction in reaction temperature achieved in practicing the process of the present invention.

An additional major advantage of the present invention is that CO is obtained as an essentially pure product as in Example 1. In conventional reverse water gas shift reactions, operated at a temperature of 275° C., the product composition would be: 5.5% CO, 5.5% $H_2O$, 44.5% $H_2$ and 44.5% $CO_2$. For reactions at 1000° and 1150° C., the compositions are (i) 28% CO, 28% $H_2O$, 22% $H_2$ and 22% $CO_2$ and (ii) 30.3% CO, 30.3% $H_2O$, 19.7% $H_2$ and 19.7% $CO_2$, respectively. Thus, the gas mixture would need to be separated by PSA/VSA technology, for example, to obtain a pure CO product.

Yet another major advantage of the present invention is that CO is obtained at feedstock pressure (eg. 57 psig in Example 1). With conventional PSA/VSA technology, the CO would be recovered at close to atmosphere pressure and would have to be recompressed for use.

EXAMPLE 3

Effect of Pressurazation Gas Type on Process Performance for Reverse Water-Gas Shift Reaction for Producing Carbon Monoxide This example demonstrates the effect of varying the type of fluid used in the fourth and fifth steps of Applicants' process described in Example 1 on reactor operation, conversion of $CO_2$ to CO and product purity. The experiments were carried out at the following conditions: Reaction Temperature=250° C.; Reaction Pressure=50 psig; $H_2$ flow rate=100 cc/min; $CO_2$ flow rate=100 cc/min; Catalyst and zeolite pellets employed in Example 1 were physically admixed (1:1 ratio by weight); Gas in reactor prior to admission of reactants=CO or $CO_2$ or $H_2$ at 50 psig. FIGS. 4, 5 and 6 illustrate the different results obtained when carbon monoxide, carbon dioxide, or hydrogen were used as the purge and pressurization fluids, respectively.

FIG. 4 illustrates the CO concentration profile and the flow rate of the reactor effluent for the reverse water gas shift reaction when the process is carried out using carbon monoxide as the purge fluid and pressurizing fluid according to the fourth and fifth steps of the process according to Example 1. Again, the hatched area of the diagram represents the carbon monoxide effluent from the reactor which is equivalent to the quantity of carbon monoxide present in the reactor at the start of the process. This amount of carbon monoxide left the reactor in just 38 minutes of the operation. FIG. 4 demonstrates that the claimed process provides a reactor effluent which comprises essentially pure carbon monoxide and that the carbon monoxide can be conveniently collected at a constant flowrate.

FIG. 5 illustrates the CO concentration profile and the flow rate of the reactor effluent for the reverse water gas shift reaction when the process is carried out using carbon dioxide as the purge fluid and pressurizing fluid according to the fourth and fifth steps of the process according to Example 1. In contrast to the results depicted in FIG. 4 when carbon monoxide was used as the purge fluid, FIG. 5 shows that the carbon monoxide concentration slowly rises, reaches a maximum and then decreases with practically no section of constant CO composition and flowrate when carbon dioxide was used as the purge fluid in the fourth and fifth steps of the process according to Example 1. Furthermore FIG. 5 shows that the CO composition of reactor effluent never exceeds 83% as opposed to essentially pure CO effluent obtained in FIG. 4 wherein carbon monoxide was used as the purge and pressurization fluid.

FIG. 6 illustrates the CO concentration profile and the flow rate of the reactor effluent for the reverse water gas shift reaction when the process is carried out using hydrogen as the purge fluid and pressurizing fluid according to the fourth and fifth steps of the process according to Example 1. In contrast to the results depicted in FIG. 4 when carbon monoxide was used as the purge fluid, FIG. 6 shows that the carbon monoxide concentration slowly rises, reaches a maximum and decreases with practically no section of constant CO component and flowrate when hydrogen was used as the purge fluid in the fourth and fifth steps of the process according to Example 1. Further, FIG. 6 shows that the CO composition of the effluent gas never exceeds 85% as opposed to essentially pure CO effluent of FIG. 4.

Several observations can be made upon reviewing the results depicted in FIGS. 4, 5 and 6. Pure CO in the product stream is surprisingly observed only in the case where carbon monoxide is used as the purge and pressure fluid of steps 4 and 5 of the general embodiment. This result does not occur when carbon dioxide or hydrogen is used as the purge and pressurization fluid. As evidenced in FIGS. 5 and 6, a maximum carbon monoxide concentration of only about 80–85% is achieved when $H_2$ or $CO_2$ are employed as the purge fluid in the fourth and fifth steps of the process according to Example 1. Thus, if a high purity CO product is desired without further separation, the reactor must be pre-saturated with the less adsorbable product, carbon monoxide.

EXAMPLE 4

Preparation and Characterization of a Potassium Carbonate Modified Double Layered Hydroxide Three samples of a potassium carbonate modified double layered hydroxide were prepared respectively by impregnation of 0.5 M, 2.0 M and 5.0 M aqueous solutions of $K_2CO_3$ into individual 3 g samples of HTC hydrotalcite powder (HTC) supplied by La Roche Company, Baton Rouge, La. The HTC was activated at 400° C. for 4 hours prior to impregnation. The carbonate solution was added to test tubes containing the hydrotalcite to the point of incipient wetness. After 1 hour, the excess liquid was decanted and the resulting paste was placed into an oven and dried at 120° C. for 16 hours. Samples of the modified HTC were activated by heating at 400–500° C. for 2 hours prior to measuring their $CO_2$ capacities. Samples prepared from the 0.5 M, 2.0 M and 5.0 M solutions were characterized by elemental analysis to contain 21.7, 57.3 and 77.0 weight percent $K_2CO_3$, respectively with Mg to Al ratios of approximately 2.1. These materials were analyzed by thermo gravimetric analysis (TGA) to possess capacities of 0.67, 0.35 and 0.15 mmol $CO_2$/g, respectively, at 400° C. under dry $CO_2/N_2$ cycling conditions ($p_{CO2}$=500 Torr). At 500° C. the same materials had capacities of 0.82 0.43 and 0.18 mmol $CO_2$/g, respectively, under similar testing conditions.

EXAMPLE 5

Effect of Low Humidity on $CO_2$-Capacity of Potassium Carbonate Modified Double Layered Hydroxide A sample was prepared by impregnating HTC powder with 0.5 M $K_2CO_3$ as described in Example 4. The effect of low moisture levels on the $CO_2$ capacity of this sample was determined by measuring its $CO_2$ capacity on the TGA under dry $CO_2$/dry $N_2$ cycling conditions. These results were compared with the $CO_2$ capacity measured under humid $CO_2$/dry $N_2$ cycling conditions. The humid $CO_2$ contained 20 Torr of water vapor pressure and was generated by saturating the dry $CO_2$ stream with room temperature water vapor. In this manner, the sample was shown to have an identical capacity of 0.66 mmol $CO_2$/g whether tested under dry or low humidity conditions at 400° C. This example demonstrates that low levels of humidity do not adversely affect the $CO_2$ capacity of the material at elevated temperaptures.

EXAMPLE 6

Preparation and Characterization of a Potassium Carbonate Modified Double Layered Hydroxide Three samples of potassium carbonate modified HTC were prepared by treatment of Alcoa HTC (⅛" extruded pellets) with 0.5 M, 2.0 M and 5.0 M aqueous solutions of $K_2CO_3$ as described in Example 4. Samples prepared from these solutions were characterized by elemental analysis to contain 3.66, 16.8 and 28.1 weight percent $K_2CO_3$, respectively with Mg to Al ratios of approximately 3.0. These materials were analyzed by TGA to have capacities of 0.28, 0.39 and 0.28 mmol $CO_2$/g, respectively, at 400° C. under dry $CO_2/N_2$ cycling conditions ($p_{CO2}$=500 Torr).

EXAMPLE 7

Effect of Steam on $CO_2$-Cpacity of Potassium Carbonate Modified Double Layered Hydroxide Potassium carbonate modified HTC was prepared by impregnation of the hydrotalcite with 2.0 M $K_2CO_3$ as described in Example 4. This sample was loaded into a cell contained in a box furnace. The sample was activated at 400° C. for two hours under a $N_2$ purge, then saturated by purging with a binary gaseous mixture of 10 atmospheres of $H_2O$ and 0.3 atmospheres of $CO_2$ at 400° C. for 1 hour. The adsorbed $CO_2$ and $H_2O$ were desorbed at 400° C. and quantitated by an in-line mass spectrometer. From this experiment the potassium carbonate modified HTC was determined to have a capacity of 0.69 mmol $CO_2$/g of adsorbent in the presence of 10 atmospheres of steam. In order to collect $CO_2$—$H_2O$ binary isotherm information under simulated process conditions, the $CO_2$ capacity was measured under $CO_2$ partial pressures ranging from 0.1 to 1.5 atmospheres while holding the water vapor pressure constant at 10 atmospheres. Under these conditions the capacity ranged from 0.52 to 1.06 mmol $CO_2$/g despite the fact that adsorption occurred in a gaseous environment with a large molar excess of $H_2O$ over $CO_2$. The $CO_2/H_2O$ binary isotherms are presented in FIG. 8.

Under 1 atmosphere of dry $CO_2$, the potassium carbonate modified HTC had a capacity of 0.85 mmol/g. The material had similar capacities for $CO_2$ whether saturated with 1 atm of dry $CO_2$ (0.85 mmol $CO_2$/g) or with a binary mixture consisting of 1 atm $CO_2$ and 10 atm $H_2O$ (0.89 mmol $CO_2$/g). The presence of water had no significant effect on the capacity of potassium carbonate modified HTC.

EXAMPLE 8

$CO_2$-Adsorptive Properties of Hydrotalcities and $K_2CO_3$

The $CO_2$ capacities of La Roche HTC, Alcoa HTC, and $K_2CO_3$ were determined by TGA under dry $CO_2$/dry $N_2$ cycling conditions. The La Roche HTC and Alcoa HTC had capacities of 0.31 and 0.21 mmol $CO_2$/g, respectively, at 400° C. $K_2CO_3$, as described in Example 3, has a capacity of <0.02 mmol $CO_2$/g under similar conditions. This demonstrates the synergistic effect that some of the modified hydrotalcites have with respect to $CO_2$ adsorption (Examples 4–6) relative to the adsorptive properties of the individual components.

EXAMPLE 9

Preparation, Characterization and Adsorptive Properties of $MgAl_2O_4$-Spinel $MgAl_2O_4$ spinel was identified as one of the decomposition products formed during the prolonged treatment of the potassium carbonate modified HTC with high temperature steam. This spinel component is believed to be responsible for the increased $CO_2$ capacity observed for samples which had undergone extensive steam stability testing. To confirm this hypothesis, pure $MgAl_2O_4$ spinel was prepared and characterized. $MgAl_2O_4$ was made by the reaction of a ground solid mixture of magnesium and aluminum acetate in the proper molar ratio at 500° C. for 4 hours. X-ray diffraction analysis confirmed the formation of a pure spinel product. A portion of this product was modified by treatment with a 2.0 M $K_2CO_3$ solution and dried at 400° C. The resulting $MgAl_2O_4$ and $K_2CO_3$ promoted $MgAl_2O_4$ had capacities of 0.32 and 0.62 mmol/g, respectively, at 400° C. under dry $CO_2$ conditions ($p_{CO2}$=500 Torr), confirming that the spinel component was responsible for the observed increased capacities.

The Examples demonstrate that the present invention for operating equilibrium controlled reactions overcomes problems associated with prior art processes wherein product flow rates do not remain constant and the desired products are present in unacceptably low concentrations in the reactor effluent while obtaining high conversion of the product at lower temperatures. Moreover, Applicants' unique series of steps for desorbing the more adsorbable product from the adsorbent residing in the reactor and for preparing the reactor for subsequent process cycles provides outstanding process efficiency and control. Having thus described the present invention, what is now deemed appropriate for Letters Patent is set forth in the following claims.

We claim:

1. A process for operating an equilibrium controlled reaction in a system which comprises a plurality of reactors operated isothermally in a predetermined timed sequence wherein the heating and cooling requirements in a moving reaction mass transfer zone within each reactor are provided by indirect heat exchange with a fluid capable of phase change at temperatures maintained in each reactor during the following cyclic steps:

(a) reacting a feedstock at a first pressure in a first reactor containing an admixture of an adsorbent and a catalyst suitable for conducting the equilibrium controlled reaction under reaction conditions sufficient to convert the feedstock into a more adsorbable product which is selectively adsorbed by the adsorbent and a less adsorbable product and withdrawing the less adsorbable product in substantially pure form under a relatively constant flow rate at the first pressure;

(b) countercurrently depressurizing the first reactor to a second pressure by withdrawing a mixture comprising unreacted feedstock, a portion of the less adsorbable product and a portion of the more adsorbable product;

(c) countercurrently purging the first reactor at the second pressure with a weakly adsorbing purge fluid with respect to the adsorbent wherein the weakly adsorbing purge fluid is a fluid other than the less adsorbable product to desorb the more adsorbable product from the adsorbent and withdrawing a mixture comprising unreacted feedstock, a portion of the more adsorbable product and a portion of the less adsorbable product;

(d) countercurrently purging the first reactor at the second pressure with the less adsorbable product to desorb the weakly adsorbing purge fluid and withdrawing a mixture comprising the weakly adsorbing fluid, a portion of the more adsorbable product and a portion of the less adsorbable product; and (e) countercurrently pressurizing the first reactor from the second pressure to the first pressure with the less adsorbable product prior to commencing another process cycle within the first reactor.

2. The process of claim 1 further comprising:

(f) separating the stream of step (a) which is enriched in the less adsorbable product and depleted in the more adsorbable product as well as unreacted feedstock to form a stream comprising the less adsorbable product.

3. The process of claim 1 further comprising:

(f) separating the product mixture of step (c) comprising unreacted feedstock, a portion of the more adsorbable product and a portion of the less adsorbable product to form a stream comprising the more adsorbable product.

4. The process of claim 1 further comprising the following step which is conducted between step (a) and step (b): countercurrently purging the first reactor at the first pressure with a weakly adsorbing purge fluid and withdrawing a mixture comprising unreacted feedstock, a portion of the more adsorbable product and a portion of the less adsorbable product.

5. The process of claim 4 further comprising separating the mixture comprising unreacted feedstock, a portion of the more adsorbable product and a portion of the less adsorbable product to form a stream comprising unreacted feedstock and recycling a portion of the stream comprising unreacted feedstock for use as feedstock to step (a).

6. The process of claim 1 further comprising:

(g) separating the mixture of step (d) comprising the weakly adsorbable purge fluid, a portion of the more adsorbable product and a portion of the less adsorbable product to form a stream comprising the weakly adsorbable purge fluid and recycling a portion of the stream for use as the weakly adsorbing purge fluid in step (c).

7. The process of claim 1 wherein the admixture of the adsorbent and the catalyst comprises from 5% to 95% by weight of the adsorbent and from 95% to 5% by weight of the catalyst.

8. The process of claim 1 wherein the feedstock comprises carbon dioxide and hydrogen, the more adsorbable product with respect to the adsorbent is water and the less adsorbable product is carbon monoxide.

9. The process of claim 8 wherein the fluid capable of phase change is selected from the group consisting of a eutectic mixture of diphenyl oxide, biphenyl oxide and steam.

10. The process of claim 8 wherein the reaction catalyst comprises a water gas shift catalyst and the reaction conditions comprise a temperature ranging from 200° to 600° C., the first pressure which ranges from 2 to 50 bar and the second pressure which ranges from 0.05 bar to 2 bar.

11. The process of claim 8 wherein the adsorbent comprises a zeolite, alumina or silica gel and the weakly adsorbing purge fluid is selected from the group consisting of methane, hydrogen, nitrogen and carbon dioxide.

12. The process of claim 1 wherein the feedstock comprises water and methane in a ratio of water to methane ranging from 1.5 to 30, the more adsorbable product with respect to the adsorbent is carbon dioxide and the less adsorbable product is hydrogen.

13. The process of claim 12 wherein the fluid capable of a phase change is selected from the group consisting of a eutectic mixture of biphenyl oxide, diphenyl oxide and dimethylpolysiloxane.

14. The process of claim 12 wherein the reaction catalyst comprises a steam-methane reforming catalyst and the reaction conditions comprise a temperature ranging from 200° to 600° C., the first pressure which ranges from 2 to 50 bar and the second pressure which ranges from 0.05 to 2 bar.

15. The process of claim 12 wherein the adsorbent comprises a metal oxide or a potassium modified double layered hydroxide and the weakly adsorbing fluid is selected from the group consisting of methane, steam, hydrogen, nitrogen and carbon monoxide.

16. The process of claim 1 wherein the feedstock comprises methane and water in a stoichiometric ratio of water to methane ranging from 1 to 1.5, the more adsorbable product with respect to the adsorbent is carbon monoxide and the less adsorbable product is hydrogen.

17. The process of claim 16 wherein fluid capable of phase change is selected from the group consisting of a eutectic mixture of biphenyl oxide, diphenyl oxide and dimethylpolysiloxane.

18. The process of claim 16 wherein the reaction catalyst comprises a steam-methane reforming catalyst and the reaction conditions comprise a temperature ranging from 200° to 600° C., the first pressure which ranges from 2 to 50 bar and the second pressure which ranges from 0.05 bar to 2 bar.

19. The process of claim 16 wherein the adsorbent comprises a monovalent silver or copper compound which is supported on a substrate and the weakly adsorbing fluid is selected from the group consisting of methane, water, hydrogen, nitrogen and carbon dioxide.

20. The process of claim 1 wherein the feedstock comprises carbon dioxide and methane, the catalyst comprises a methane reforming catalyst, the more adsorbable product with respect to the adsorbent is hydrogen and the less adsorbable product is carbon monoxide.

21. The process of claim 20 wherein the fluid capable of phase change is selected from the group consisting of a eutectic mixture of biphenyl oxide, diphenyl oxide and dimethylpolysiloxane.

22. The process of claim 20 wherein the reaction conditions comprise a temperature ranging from 200° to 600° C., the first pressure which ranges from 2 to 50 bar and the second pressure which ranges from 0.05 to 2 bar.

23. The process of claim 20 wherein the adsorbent comprises a hydrogen complexing metal alloy and the weakly adsorbing fluid is selected from the group consisting of methane, steam, carbon dioxide, carbon monoxide and nitrogen.

24. The process of claim 1 wherein the feedstock comprises carbon dioxide and methane, the catalyst comprises a methane reforming catalyst, the more adsorbable product with respect to the adsorbent is carbon monoxide and the less adsorbable product is hydrogen.

25. The process of claim 24 wherein the fluid capable of phase change is selected from the group consisting of a eutectic mixture of biphenyl oxide, diphenyl oxide and dimethylpolysiloxane.

26. The process of claim 24 wherein the reaction conditions comprise a temperature ranging from 200° to 600° C., the first pressure which ranges from 2 to 50 bar and the second pressure which ranges from 0.05 to 2 bar.

27. The process of claim 24 wherein the adsorbent comprises a $Cu^+$ or $Ag^+$ salt and the weakly adsorbing fluid is selected from the group consisting of hydrogen, nitrogen, methane, carbon dioxide and steam.

* * * * *